United States Patent
Zerwes et al.

[15] 3,686,425
[45] Aug. 22, 1972

[54] RAIN TIGHT HOODED JUNCTION BOX AND COVER THEREFOR

[72] Inventors: Paul J. Zerwes; Theodore A. Cohen, both of Chicago, Ill.

[73] Assignee: Bell Electric Company, Chicago, Ill.

[22] Filed: Feb. 4, 1971

[21] Appl. No.: 112,617

[52] U.S. Cl. ...................... 174/53, 174/67, 220/24.3
[51] Int. Cl. ................................................. H02g 3/18
[58] Field of Search ........................... 174/53–58, 67; 220/3.2–3.94, 24.3

[56] References Cited

UNITED STATES PATENTS

| | | | |
|---|---|---|---|
| 3,439,108 | 4/1969 | Zerwes | 174/53 |
| 3,402,846 | 9/1968 | Zerwes | 220/3.8 |
| 2,881,240 | 4/1959 | Seif | 174/58 |

Primary Examiner—Lewis H. Myers
Assistant Examiner—D. A. Tone
Attorney—Silverman & Cass

[57] ABSTRACT

A rain tight, weatherproof electrical junction box having an outer hood on the front panel and a hooded, spring loaded cover mounted for pivotal movement within the outer hood between open and closed conditions, the cover being mounted on journal means such as pins seated within elongate slot means provided in the outer hood. The cover is spring-loaded by means of expansile coil spring means connected between the cover and the front panel, the axis of said spring means arranged normal to the axis of rotation of the cover. Cam means are provided at the rear edge of the cover for assisting in the positioning of said cover; bead mean are provided for assuring against moisture seepage along the cover to the front panel; and captive means are described for facilitating the securement of the combined panel and cover to an underlying installation, where necessary.

29 Claims, 15 Drawing Figures

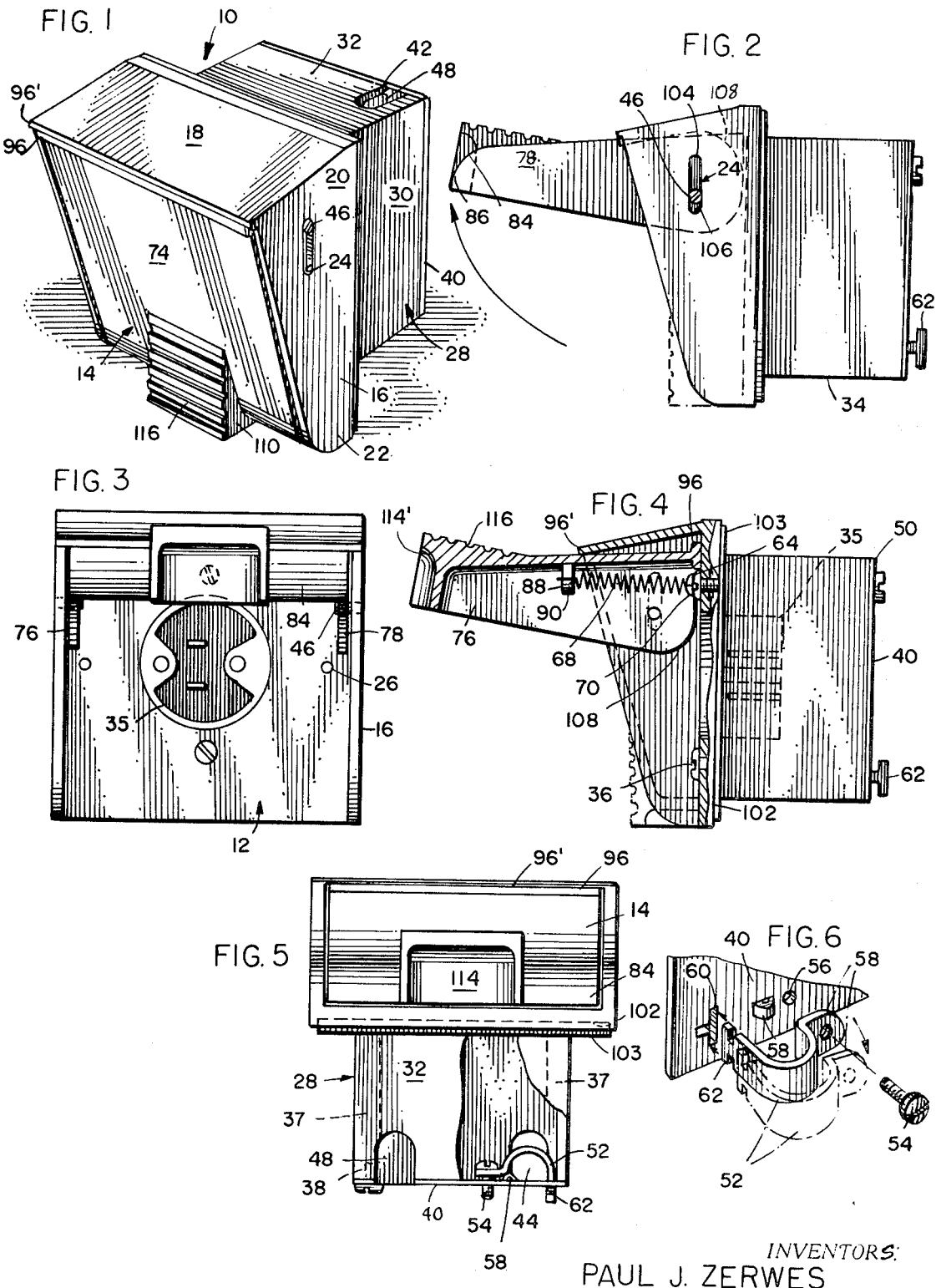

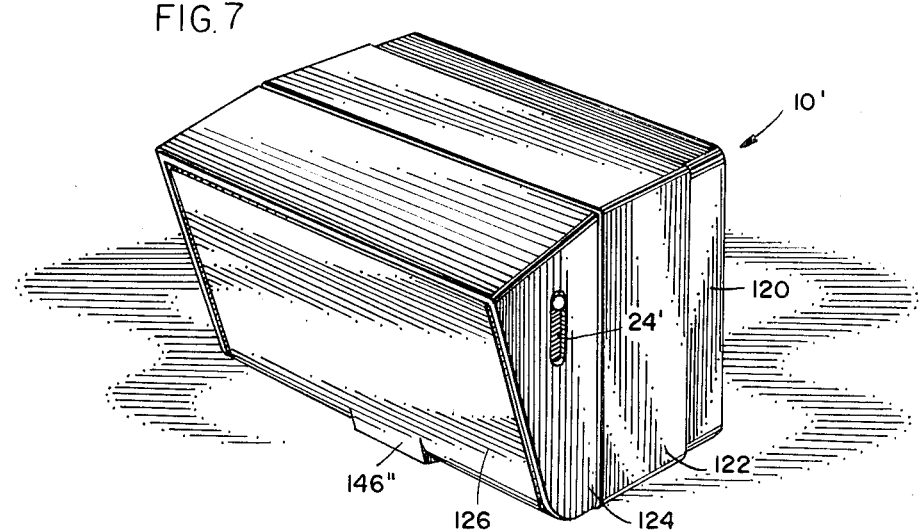
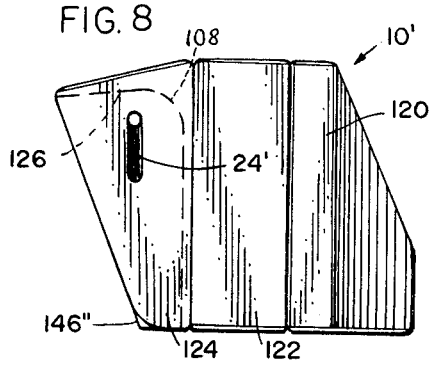
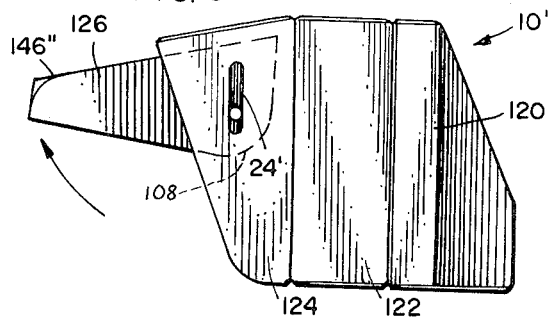
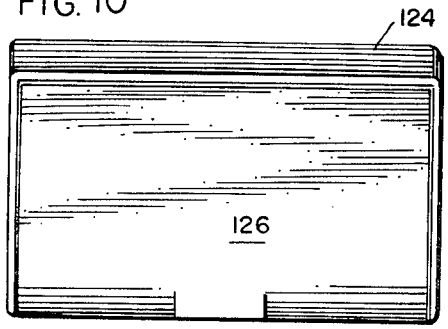
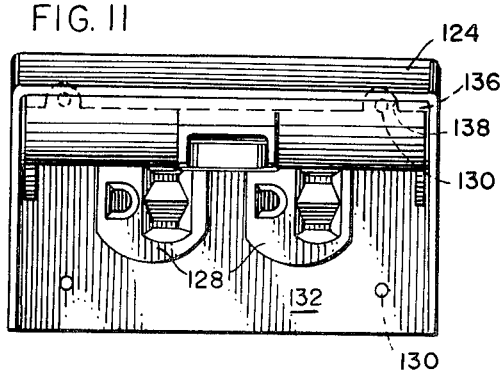
INVENTORS:
PAUL J. ZERWES
THEODORE A. COHEN

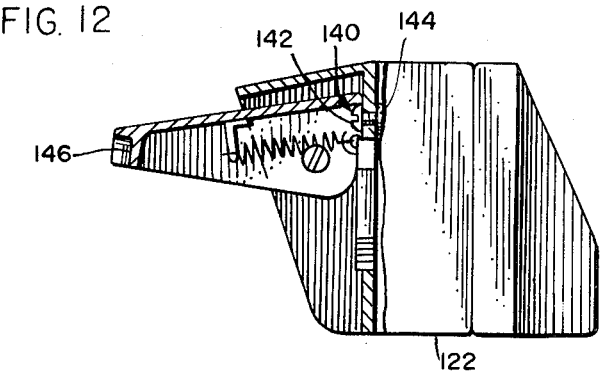
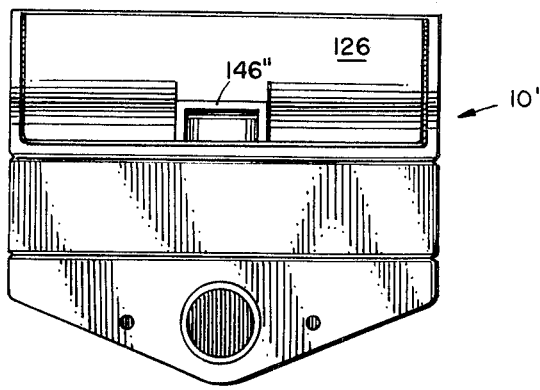
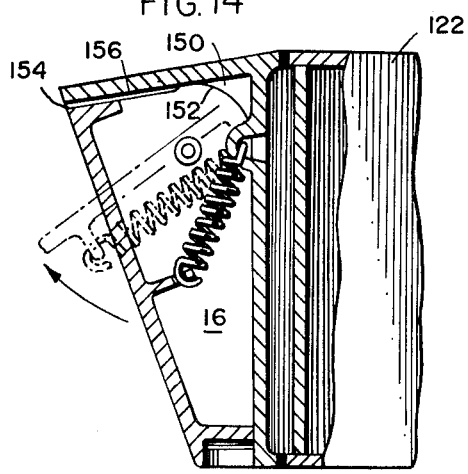
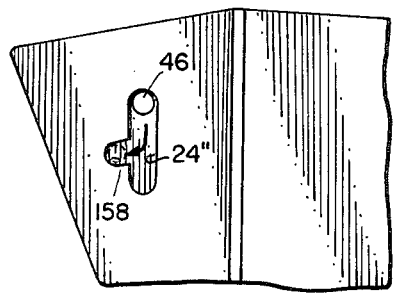
INVENTORS:
PAUL J. ZERWES
THEODORE A. COHEN

RAIN TIGHT HOODED JUNCTION BOX AND COVER THEREFOR

FIELD OF THE INVENTION

This invention relates generally to weatherproof electrical junction boxes and more particularly concerns the provision of a rain tight, weatherproof electrical junction box having an outer hood and a spring loaded hooded cover arranged for pivotal movement within the outer hood between fully open and fully closed conditions, and being rain tight in both conditions.

BACKGROUND OF THE INVENTION

Modern outdoor living trends have created increased demand for weatherproof type electrical junction box installations. These installations are characterized by means to shield the face of the installation from direct exposure to the weathering elements such as rain, snow and the like. One must provide against entry of moisture, dust and the like to the interior of the installation and also provide adequate access to the electrical appliances mounted within the installation for establishment of electrical connections thereto. Adequate space must be provided interior of the installation so that the appliances and the wiring therefor can be contained therewithin. Cost consideration is a prime criterion in the design of such outdoor installations and the apparatus therefor, and hence, ease of fabrication and assembly are important considerations in determining the feasibility of any proposed structure for these purposes.

In addition to the demand created for weatherproof electrical installations for general outdoor uses such as lighting, outdoor cooking and to provide outdoor electrical services, say at gardens, garages, patios, poolside and the like installation areas, there is a substantial demand for providing electrical power and services for use in mobile homes, mobile carry-alls and the like. Generally, the resting sites such as mobile home parks and the like include parking areas whereat electrical power outlets are provided at selected areas so that the power connection can be made and taken by way of connection to electrical appliances carried in junction boxes mounted in and through the wall of the mobile home, etc. One important requirement for such electrical junction boxes which are carried on the mobile home is the elimination and/or maximum reduction of any protruding objects from the exterior walls of the mobile homes, etc., especially during the in-transit condition thereof. Accordingly, standards have been established which sharply limit the exterior protrusion of any installation from the exterior walls, especially during transit conditions of the mobile home, etc. Weatherproof electrical junction box installations which provide adequate shielding of the electrical appliances and yet meet the established standards and also are rain tight are not available except with the use of substantial gasketing and complex structures, which are not satisfactory.

In U.S. Pat. No. 3,439,108, there was provided a hooded weatherproof electrical junction box installation which included an integral canopy extending forwardly of an inclined planar mounting wall functioning as the face plate of the electrical junction box. Structures made in accordance with the teachings of said patent have become widely accepted in the trade as embodied in at least two distinct forms. One of these forms comprise a hooded adapter structure for installation on a pre-existing junction box installation, or on an exterior adapter for a junction box or simply to a face plate mounted to a wall. The hooded structures according to the aforementioned patent also take the form of a unitary cast hooded junction box. Those structures which are provided in accordance with the teachings of patent 3,439,108 have in common the use of conventional spring bias hinged snap covers suitably fastened on the front planar wall or on the face plate secured to said planar wall and are arranged to cover the access opening provided to the electrical appliance. Such snap covers generally have been of the type constructed in accordance with the teachings of U.S. Pat. No. 2,867,345. Such snap cover structure normally is connected pivotally to a bracket which fastens to the front planar wall or to the face plate and carries a gasket for establishing a seal about the access opening to the electrical receptacle or similar appliance when the snap cover is positioned thereover. The snap cover thus constructed can be pivoted and maintained either in fully open or fully closed conditions by provision of conventional spring means arranged coaxial with the pivot axis of the cover and firmly engaging at both ends, the cover and the bracket respectively.

While the aforesaid snap cover structures were widely accepted and have considerable advantage over their predecessors, certain physical disadvantages are inherent therein. These problems were set forth in U.S. Pat. No. 3,402,486 which provided a spring loaded articulated cover and face plate unit for electrical junction boxes having a rain tight cover mounted to the face plate or planar front wall by way of an articulated linkage, within which there was provided a spiral tension spring. The patented arrangement was quite satisfactory, yet was not as sufficiently economical for wide usage to meet the multiple applications enumerated above.

It should be understood that the terms "weatherproof" and "rain tight" comprise terms accepted in the trade to denote resistance to adverse weather conditions, principally driving rain and snow. The term "rain tight" is the most restrictive and demanding of the trade classifications and requires the prevention of moisture from entering the junction box enclosure under driving rain conditions angled toward the front and sides of the junction box at approximately 45 degrees both in the open and in the closed condition of the receptacle cover or covers.

The hooded junction box installations constructed in accordance with the teachings of said U.S. Pat. No. 3,439,108 are not as satisfactory as the industry desires where the installations are for use in the mobile home and the like applications mentioned above in view of the considerable depth of the installation, even on occasions where the covers are in their closed condition.

Accordingly, the object of this invention is to provide a rain tight electrical junction box construction for use in the mobile home and other similar vehicle.

Another object of this invention is to provide a rain tight electrical junction box construction which includes an outer hood and a hooded cover spring loaded for pivotal movement within the outer hood.

Another object of this invention is to provide a rain tight hooded electrical junction box which is versatile as well as being simple and economical to fabricate and install.

Another object of the invention is to provide a combined cover and face plate unit for an electrical junction box which can be applied to any known junction box assembly either directly or by means of conventional extension means so as to provide a rain tight installation.

An important object of the invention is to provide a hooded, rain tight, weatherproof electrical junction box with a spring loaded cover pivotally movable within the hood portion thereof having means for facilitating the installation thereof notwithstanding the inaccessibility of some of the standardized threaded mounting openings provided on the face plate due to the position of the cover, said means comprising captive screw means installed within said otherwise blocked openings.

Another object of this invention is to provide a rain tight electrical junction box having an outer hood and a hooded spring biased cover pivotally movable within the outer hood between fully open and fully closed conditions and said cover carrying means for preventing seepage of moisture along the cover to the face plate of the junction box.

An important object of this invention is to provide an electrical junction box with a combined hood and snap cover assembly for an electrical junction box installation whereby the latter is rendered rain tight and said assembly includes a hood face plate and cam means at the rear edge of the cover, spring means connected between the cover and the face plate and guide means for limiting movement of said cover.

A still further object of this invention is to provide a combined hood and snap cover assembly for an electrical junction box installation whereby the latter is rendered rain tight.

An additional object of the invention is to provide a combined hooded face plate and a spring biased hooded snap cover assembly for an electrical junction box installation, the cover mounted for pivotal movement within the face plate hood between fully open and fully closed condition, slot means provided in said face plate hood and pin means secured to the cover, said pin means being seated within said slot means, said pin means being arranged for limited vertical movement along said slot means and cam means operable to position and maintain said cover in its open and closed conditions.

Still other objects and advantages of this invention will become evident as several exemplary embodiments thereof are described in detail with reference to the accompanying drawings.

SUMMARY OF THE INVENTION

A rain tight hooded electrical junction box having an outer hood and a spring biased hooded cover arranged for pivotal movement within the outer hood between an open and closed condition, and journal means mounting said cover, and slot means formed in the outer hood and adapted to receive the journal means therein for vertical movement therein during the movement of the cover, the cover projecting substantially forwardly of said outer hood during the open condition and cam means for enabling the movement of said cover against the spring bias.

DESCRIPTION OF THE DRAWINGS

FIG. 1 is a perspective view of a hooded junction box and hooded cover assembly according to the invention arranged connected to a junction box, particularly adapted for use to feed electrical power to the interior of a mobile home or the like.

FIG. 2 is a side elevational view of the box illustrated in FIG. 1, but illustrating the cover in open condition and the phantom representation denoting the cover in closed condition.

FIG. 3 is a front elevational view of a box illustrated in FIG. 2 but with the cover illustrated in open condition.

FIG. 4 is a partial sectional view taken through the box illustrated in FIG. 3.

FIG. 5 is a bottom view of the box as shown in FIG. 1, with portions broken away to show interior detail.

FIG. 6 is an exploded view illustrating the rear cover plate and cable clip, the phantom representation showing the clip in outwardly pivoted condition for receiving the cable.

FIG. 7 is a perspective view of a slightly modified embodiment of the invention.

FIG. 8 is a side elevational view of the structure illustrated in FIG. 7.

FIG. 9 is a side elevational view of the structure illustrated in FIG. 7 but with the cover open.

FIG. 10 is a front elevational view of the structure illustrated in FIG. 7.

FIG. 11 is a view similar to that of FIG. 10 but with the cover open.

FIG. 12 is a partial sectional view through another modified form of the invention.

FIG. 13 is a bottom view of the structure illustrated in FIG. 12 with the cover closed.

FIG. 14 is a fragmentary sectional view of the structure shown in FIG. 12 but on an enlarged scale and illustrating the progressive movement of the cover from its closed to its opened conditions.

FIG. 15 is a fragmentary elevational view of a further modified form of the invention.

DESCRIPTION OF PREFERRED EMBODIMENTS

As will be described hereinafter, the invention herein may be embodied in structures functioning as electrical junction box assemblies or as extension adapters for attachment to conventional junction box installations or secured to extension adapters such as those disclosed in U.S. Pat. No. 3,288,910 and the like.

In FIG. 1, the invention is illustrated as embodied in a hooded junction box and cover assembly which is capable of being installed into the wall of a mobile home for mounting a so-called power inlet to conduct power to the interior of the mobile home from an exterior or outdoor mounted electrical power junction box. The junction box and cover assembly embodying the features of the invention is designated generally by reference character 10 and comprises a perforate front wall or panel designated generally by reference character 12 and a cover member designated generally by reference character 14. The panel 12 is of substantially rectangular configuration and has a pair of congruent, parallel side walls 16 integral therewith and normal thereto. The walls 16 are of generally triangular configuration and are bridged by a downwardly, outwardly sloping top wall 18 also integral with the panel 12. The side walls 16 have their maximum width at the upper portion 20 thereof and narrow toward the base 22 thereof. An elongate vertical slot 24 is formed in each of the side walls 16. The panel 12, the side walls 16 and bridging or top wall 18 preferably are cast as a single unit. The panel 12 has a pair of perforations 26 so as to enable securement thereof to a backing construction wall (not shown). A hollow rearwardly opening housing 28 extends rearwardly of the panel 12 and preferably is integral therewith. The housing 28 is of generally rectangular configuration and has a pair of parallel side walls 30 and top and bottom walls 32, 34. Passageways 36 are formed in the front panel to enable fastening of the electrical wiring device 35 thereto.

The rear of the housing 28 is open for access thereto. Opposite corners of the housing 28 are provided with thickened portions or standards 37 which are provided with threaded sockets 38, so that a rear cover plate 40 may be attached thereto. A pair of like dimensioned, U-shaped, rearwardly opening slots 42, 44 are formed in the top and bottom walls 32, 34 to enable cable (not shown) to be fed therethrough into and out from the junction box housing 28 so as to permit cable access at the top or the bottom thereof, as desired. The rear cover 40 is a relatively flat plate of size and configuration to cover the open rear of the housing 28. A tab or lug 48 of U-shaped configuration is formed at the one edge 50 of the plate 40 near one corner thereof and extends at right angle to the plate 40, said lug 48 being of size and configuration to cover only one of the U-shaped lead out slots 42, 44 leaving the other open. A cable clip 52 is secured to the plate 40 by means of screw 54 passing through perforation 56. A raised abutment or guard 58 is formed adjacent the perforation 56 and a T-shaped slot 60 is formed at the corner of the plate 40 diagonally opposite the lug 48. The clip 52 includes an end section 62 of T-shaped configuration for cooperatively being received within slot 60.

The rear plate 50 can be removed and replaced by a conventional face plate (not shown), or the rear opening could be covered by another, say an interior type, junction box (not shown) whereby a receptacle or switch could be housed therein for access thereto, in a mobile home, for example.

A pair of apertured lugs or rings 64 is secured or otherwise formed vertically arranged at opposite sides of the panel 12 to enable securement of the ends 70 of a pair of expansile coil springs 68 in a toggle arrangement. The cover 14 is of complementary configuration to the panel 12 and to the outer hood which is defined by the walls 16 and 18. The cover 14 has a top wall 74 and a pair of opposite parallel, triangular side walls 76, 78 disposed normal to wall 74. Top wall 74 has a downwardly sloping front portion represented by reference character 84. The edge 86 of portion 84 is intended to engage the panel 12 in the closed condition of cover 14.

The relative size and dimensions of the respective elements are selected so that the hooded cover 14 is movable within the hooded enclosure defined by the side walls 16 and top wall 18. A pair of apertured lugs 88 is provided within the cover 14 on the undersurface thereof, and said lugs 88 generally are integral with said cover and arranged to enable the other ends 90 of springs 68 to be secured to the cover 14. The rear free corners 108 of the side walls 76, 78 are rounded to serve as cam means during the course of rotation of the cover 14 about the axis of pins 46. The adjacent planar front panel 12 serves as the cam engaging means or surface during movement of the cover 14.

An aperture 94 is provided on each side wall 76, 78 so that journal means such as screws or pins 46 may be passed therethrough to complete the assembly of the cover 14 to the hooded front panel 12. The pins 46 pass through the openings provided in the side walls 76, 78. Pins 46 then seat in the slots 24 in each side wall 16 and cooperate with the bearing means in the form of said slots 24, thus serving as journal means for the cover 14 permitting its pivotal rotation within the outer hood defined by walls 16 and 18. A raised bead 96 is provided at the rear edge 98 of the cover 14 and a similar bead 96' may be provided at the front edge of the wall 18. The bead 96 serves to prevent moisture from reaching the front panel surface and/or interior of housing 28 by creeping along the cover and wall surfaces. It is to be understood that the position of the pins 46 and slots 24 may be interchanged so that the pins are on the outer hood and the slots are formed in the cover.

The rear surface of front panel 12 is undercut to define a channel 102 surrounding housing 28 and a gasket 103 is received therein so that there is a seal established between the construction wall (not shown) and the undersurface panel 12 when the structure 10 is installed.

In the closed condition of the cover 14, the journal pins 46 are located at the upper end portion 104 of the slots 24. When the cover 14 is opened against the spring bias, the pins 46 respectively are forced along the slots 24 until each reaches the lower end 106 thereof. During such rotation the cover 14 is forced by the engagement of arcuate edge portions 108 with the planar front wall 12, causing the pins 46 to move downward along the slot 24 yet maintaining the orientation of the cover 14 within the outer hood defined by walls 16 and 18.

When the cover has been rotated about an arc sufficient to terminate the contact between edge portions 108 and the planar front panel or wall 12, the contractile force of the springs 68 forces the rear edge of the cover 14 to bear tightly against the surface of the panel 12. When the cover 14 is in open condition, with the upper wall 80 thereof, arranged substantially normal to the planar front panel 12 and the front edge of wall 18 engaging cover wall 80, the pins 46 are in an intermediate position between the ends of the slots 24. When the cover 14 is in closed condition, the pins 46 are disposed at the upper end of the slots 24. In the course of rotation of the cover the pins 46 travel to the bottom ends of the slots 24 and then assume the aforementioned disposition thereof when the cover 14 is in fully open condition.

Grasping means are provided for the cover 14, here in the form of an integral raised portion 110 having a recess 114 and corrugated surface 116. The springs 68, maintain the firm engagement of cover 14 to the front wall 12 both in open and closed conditions of the cover.

In the open condition, the effective shielding is increased substantially due to the added overhang of the cover 14 in its open condition and moisture is prevented from reaching either the interior of housing 28 or the planar front surface of panel 12 whereby to establish a rain tight condition. The action of the springs 68 when the cover is closed likewise causes a tight engagement of the cover at its top and bottom edges against the front panel 12 so as to maintain the rain tight condition.

Referring now to FIGS. 7 through 13, the invention as illustrated therein is embodied in a junction box 10' which comprises a separate rear housing 120, an extension or adaptor device 122, a hooded face plate 124 and a spring loaded hooded cover 126. Obviously, the rear housing 120 and the extension adaptor 122 can comprise a single casting, if desired. Likewise the hooded face plate comprising walls 12, 16 and 18 can be a single casting.

The junction box 10' is of the horizontally disposed one-gang type for accommodating a wiring device or appliance, such as the twin receptacle 128. The box 10' may be attached to an underlying face plate (not shown), to extension adaptor 122 and includes threaded apertures 130 at preselected locations near the corner of the face plate 132. As shown in the embodiment illustrated in FIGS. 7 – 13, the raised beads such as provided at the front edge of the top wall 18 and the rear edge of cover 14 of box 10, are absent in the box 10'. The rear edge 134 of cover 126 has a depending flange 136 with a pair of slots 138 of semicylindrical configuration formed therein and opening outwardly thereof. The slots 24' which, as explained, guide the movement of journal pins 46 of box 10', are slightly longer than the slots 24 of box 10. Due to the increased length of the slots 24', the cover can be moved against the spring bias and along a plane taken parallel to the wall 12' to establish access to the upper ones of threaded apertures 138; such access being otherwise obstructed by the cover 126 so that the screw means required for securing the hood and cover structure to the underlying installation can be rendered accessible and manipulated without the use of special tools. This is aided by captive screw means 140 which are mounted securely in the apertures 130 and carried with the hooded cover and face plate arrangement. Such captive screw means 140 comprise screws 142 anchored in place, as by small lock washers 144. Other methods of providing captive screw means 140 are known to the art and equally applicable herein.

In box 10', the grasping means are in a slightly different form than that present in box 10, comprising a recess 146 formed at the front edge of cover 126 and a raised portion 146''.

In FIG. 12 the structure is shown with the cover at its open condition, and the rear edge of cover 126 is shown engaged against the front panel surface. The phantom line representation illustrated the cover 126 being pulled down as aforedescribed, to gain access to the respective screw means 140 from the front of the box 10'.

In FIG. 14 a modified embodiment of the invention is illustrated wherein an abutment 150 is provided on the interior surface of each of the side walls 16 which together with the top wall 18, define the outer hood. The abutment 150 is located adjacent the juncture between the side walls and the planar front panel 12 and has an arcuate edge 152 arranged to engage the rear edges 154 of the cover 126 and is complementary thereto. A raised filet 156 is provided along the interior of the cover 14 at the juncture of the side walls 16 and the top wall 18, defining the outer hood, and is arranged to be engaged by the cover 126 during the opening and closing of said cover.

In FIG. 15, the modified embodiment of the invention which is illustrated therein is like the structures previously illustrated in the other Figures except the slot 24'' differs from slots 24 and 24' in providing a notch 158 for positively locking the cover in its open condition. This is effected by forcing of the pins 46 into notch 158.

What it is desired to be secured by Letters Patent of the United States is:

1. A rain tight electrical junction box assembly comprising a housing defining an enclosure for containing electrical appliance wiring connection means, said housing having at least a front wall provided with means for establishing access to the appliance wiring connection means, first hood means peripherally disposed about the top and side edges of said front wall and extending forwardly thereof to shield the said front wall at the top and sides thereof, and hooded cover means pivotally mounted within said first hood means for movement between a closed first position and an open second position, said hooded cover means extending between the top and sides of said first hood means when in said first position whereby to conjoin with said first hood means blocking access to said front wall, said second position being one in which said hooded cover means is at least partially disjoined from said first hood means substantially uncovering said front wall.

2. The junction box assembly as claimed in claim 1 in which means are provided biasing the movement of said hooded cover means at least to said first position.

3. The junction box assembly as claimed in claim 2 in which the biasing means comprise spring means connected between said hooded cover means and said front wall at a location which provides biasing said movement also to said second position.

4. The junction box assembly as claimed in claim 3 in which there are journal means on the hooded cover member and vertically oriented slot means in said first hood means, the journal and slot means cooperating such that in addition to pivotal movement of the hooded cover member there is vertical movement, the spring means being connected to said hooded cover member to provide a toggle action thereof whereby the second position is one in which the hooded cover member is closely nested in the bottom of said first hood means.

5. The junction box assembly as claimed in claim 2 in which cam means are provided at the rear of said hooded cover means and cam engaging means are provided on said front wall, the pivotal movement of the hooded cover means including movement of the cam means on the cam engaging means.

6. The junction box assembly as claimed in claim 1 in which there are journal and bearing means interconnecting said first hood means and hooded cover means and providing the said pivotal mounting of said hooded cover member.

7. The junction box assembly as claimed in claim 6 in which said bearing means comprises vertically oriented slot means whereby said pivotal movement includes limited vertical movement as well.

8. The junction box assembly as claimed in claim 7 in which said vertically oriented slot means include intermediate notch means for locking said hooded cover means in said second position.

9. The junction box assembly as claimed in claim 1 in which there is a raised bead along the rear edge of said hooded cover means.

10. The junction box assembly as claimed in claim 1 in which the top of the first hood means is inclined slightly downwardly and the front to rear width of said sides decrease generally downwards and in which the hooded cover means has a generally rectangular front wall and parallel side walls connected therewith and each of a configuration similar to but somewhat smaller than that of said sides of said first hood means, said first position being one in which the parallel side walls are respectively disposed closely inside of and in generally congruent disposition relative to the sides of said first hood means while the rectangular front wall closes the front opening defined by said first hood means and said second position is one in which the rectangular front wall of the hooded cover means is arranged generally horizontally with a substantial portion thereof within the first hood means and engaging the bottom of the top of said first hood means while the parallel side walls are generally at a substantial angle relative to the sides of the first hood means.

11. The junction box assembly as claimed in claim 10 in which the said rectangular front wall is curved generally inwardly at least toward the bottom edge thereof to close off the bottom of the opening of said first hood means when said hooded cover means is in said first position.

12. The junction box assembly as claimed in claim 1 in which said front wall is separable from the remainder of said housing and means are provided for removably securing said front wall to said enclosure.

13. The junction box assembly as claimed in claim 12 in which said means comprise captive screws secured to said front wall and sockets for receiving said screws in said housing.

14. The junction box assembly as claimed in claim 12 in which yieldable means are provided connecting said hooded cover means to said front wall whereby to enable translation of said hooded cover member slightly downwardly when in said second position but without pivoting the same whereby to provide access to at least some of said securing means by way of the resulting space opened between said hooded cover means and first hood means.

15. A rain tight electrical junction box comprising a housing defining an enclosure for containing an electrical wiring appliance, said housing having front, rear, top, bottom and a pair of side walls, the front wall having means for establishing access to the electrical wiring appliance and first hood means about the peripheral top and side edges of said front wall and extending forwardly thereof, cover means seated within said first hood means and having second hood means about the peripheral top and side edges thereof, means for pivotally mounting the cover means for rotation within said first hood means, said mounting means comprising journal means secured to the sides of one of said first and second hood means and elongate slot means formed in the sides of the other of said first and second hood means, said slot means adapted to receive said journal means therein and spring means connected to and between the cover means and the front wall to bias the cover means into open condition in which it extends forwardly and outwardly of said first hood means and into a closed condition engaged tightly against said front wall.

16. The junction box as claimed in claim 15 in which the journal members are secured to the sides of the second hood means and the slot means are formed in the sides of the first hood means.

17. A hooded face plate adapted to be secured across the face of an electrical junction box or the like installation and having a spring biased cover member of size and configuration for seating within the hooded portion of said hooded face plate for enclosing substantially the entire face of said face plate, said cover member including a substantially planar wall having an inclined forward portion and a pair of parallel side walls at opposite side edges of said substantially planar wall coextensive therewith, said side walls having a triangular configuration, spring means coupled between said face plate and said substantially planar wall of said cover member for supplying the spring bias and means mounting said cover member for pivotal rotation within the hooded portion of said hooded face plate.

18. The hooded face plate as claimed in claim 17 in which said mounting means include journal pins secured to the side walls of said cover member and slot means for receiving said journal pins for limited movement therewithin along the length thereof during opening and closing of the cover member.

19. The hooded face plate as claimed in claim 18 in which the journal pins are disposed at one end of the slot means when the cover member is in enclosing position and are adapted to move to the opposite end of the slot means during the opening movement of the cover member and to rest at a position intermediate the ends of the slot means during the open condition of the cover member.

20. The hooded face plate as claimed in claim 17 in which the spring means comprise coil springs arranged with their axes normal to the axis of rotation of the cover.

21. An electrical junction box comprising a housing defining an enclosure for containing an electrical wiring appliance and having a front panel, top, bottom and a pair of side walls and a removable rear wall, said rear wall comprising a plate removably secured over the rear opening of said housing, said plate including a flange at one corner thereof and cable clip means at the diagonally opposite corner thereof, said top and bottom walls of the housing having a pair of relatively offset, rearwardly opening slots, the flange on the plate and the last mentioned slots being of conforming configuration whereby on installation of the plate, one of said slots is covered and the other is disposed immediately adjacent the cable clip means.

22. The junction box as claimed in claim 21 in which said cable clip means include an arcuate band portion having an apertured flange at one end and a T-shaped extension at the other, opposite end, and a T-shaped slot at the said diagonally opposite corner of the plate, the last mentioned flange adapted to be secured to the plate with the T-shaped extension received within the T-shaped slot.

23. The junction box as claimed in claim 22 in which said T-shaped extension is seated within the T-shaped slot so as to be spaced from the cross portion thereof and be capable of limited rotational movement in an axial plane taken normal to the plate.

24. The junction box as claimed in claim 21 in which said plate is selectively removable and replaceable for leading cable selectively out of one of the top and bottom walls of the housing.

25. A substantially rain tight hooded cover assembly for securement to a junction box or the like electrical appliance apparatus and comprising:
  A. a generally rectangular face plate adapted to be mounted to said apparatus and provided with means giving access to said apparatus by way of said face plate, said face plate having a hooded configuration secured to its upper edge and side edges comprising forwardly extending connected top and side hood walls,
  B. a cover member including a front cover member wall and a pair of generally triangular side cover member walls connected along the opposite edges of the front cover member wall and coextensive therewith, the dimensions and configuration of the cover member relative to the face plate and hooded configuration being such that the cover member may be matingly engaged within the hooded configuration with the side cover member walls disposed inside of the side hood walls and the front cover member wall closing off the space defined by the front of the top hood wall and the bottom edge of the face plate, said engagement comprising a first position of said cover member in which said face plate is substantially fully enclosed,
  C. the cover member being pivotally mounted for rotation within the hooded configuration between the said first position and a second position in which the cover member wall is at a substantial angle relative to its location in said first position and extending forwardly of said hooded configuration thereby exposing said face plate and
  D. spring means engaged between said face plate and cover member to bias said cover member at least to said first position.

26. The hooded cover assembly as claimed in claim 25 in which the rear edges of said side cover member walls are configured as cam surfaces and the front of the face plate has cam engaging means adapted to engage said cam surfaces during the pivotal movement of said cover member, said spring means also serving to press the cam surfaces against the cam engaging means.

27. The hooded cover assembly as claimed in claim 25 in which said spring means are connected in a toggle arrangement so as to bias said cover member to either position after a partial movement from one position to the other.

28. The hooded cover assembly as claimed in claim 27 in which said cover member has a vertically oriented slot and journal connection between the side cover member walls and the side hood walls whereby to provide a vertical as well as pivotal movement for said cover member and the spring means being connected to raise the cover member against the interior of the top hood wall when said cover member is moved to said second position substantially to seal said cover member against said hooded configuration when in said second position.

29. The hooded cover assembly as claimed in claim 28 in which the front cover member wall has a bead on its exterior surface adapted to engage the interior of said top hood wall to provide said seal.

* * * * *